US00RE40438E

(19) United States
(12) Reissued Patent
Urakawa et al.

(10) Patent Number: US RE40,438 E
(45) Date of Reissued Patent: Jul. 22, 2008

(54) MOUNTING UNIT FOR HEAD MOUNTED APPARATUS AND HEAD MOUNTING APPARATUS

(75) Inventors: Takashi Urakawa, Kanagawa (JP); Yoshihiro Saito, Tokyo (JP)

(73) Assignee: Canon Kabushiki Kaisha, Tokyo (JP)

(21) Appl. No.: 11/361,035

(22) Filed: Feb. 22, 2006

Related U.S. Patent Documents

Reissue of:
(64) Patent No.: 6,978,478
Issued: Dec. 27, 2005
Appl. No.: 10/612,587
Filed: Jul. 1, 2003

(30) Foreign Application Priority Data

Jul. 2, 2002 (JP) ..... 2002-193004

(51) Int. Cl.
*A61F 9/00* (2006.01)

(52) U.S. Cl. ..... 2/15
(58) Field of Classification Search ..... 2/9, 2/448, 6.3, 12, 15, 13; 74/159–161; 345/8
See application file for complete search history.

(56) References Cited

U.S. PATENT DOCUMENTS 5,546,099 A * 8/1996 Quint et al. ..... 345/8
6,677,919 B2 * 1/2004 Saito ..... 345/8
6,978,478 B2 * 12/2005 Urakawa et al. ..... 2/15
2002/0008677 A1 * 1/2002 Saito ..... 345/8
2006/0070168 A1 * 4/2006 Nakabayashi et al. ..... 2/171

FOREIGN PATENT DOCUMENTS

JP 2002-44566 2/2002

* cited by examiner

*Primary Examiner*—Katherine Moran
(74) *Attorney, Agent, or Firm*—Morgan & Finnegan, LLP

(57) ABSTRACT

A mounting unit that can be worn easily and in which size adjustment and lock release can be operated with a natural hand position is disclosed. The mounting unit includes a front frame and a rear frame. The rear frame being connected to the front frame can move in a back and forth direction with respect to the front frame. And the unit includes knob members which are provided on both the right and left portions of the rear frame, for operation of backward movement of the rear frame. Furthermore, the unit includes lock mechanisms which prevent the backward movement of the rear frame with lock release buttons which allow release of the lock of the lock mechanisms. The knob members are arranged under both frames. Each of the lock release buttons is arranged at a portion on each of the knob members where the user pushes with his/her finger when a user will move the rear frame backward with respect to the front frame.

6 Claims, 9 Drawing Sheets

MOUNTING UNIT FOR HEAD MOUNTED APPARATUS AND HEAD MOUNTING APPARATUS

Matter enclosed in heavy brackets [ ] appears in the original patent but forms no part of this reissue specification; matter printed in italics indicates the additions made by reissue.

*The present application is a reissue application of U.S. Pat. No. 6,978,478 to Takashi Urakawa et al., which issued on Dec. 27, 2005 from application Ser. No. 10/612,587 (filed Jul. 1, 2003).*

BACKGROUND OF THE INVENTION

1. Field of the Invention

The present invention relates to a mounting unit for a head mounted apparatus to be worn on a user's head.

2. Description of the Related Art

A head mounted apparatus with an image display portion to be worn on a user's head (in front of user's eyes) allowing the user to enjoy what's being displayed on the image display portion has been proposed. For this type of head mounted display apparatus, a mounting unit which comprises a front frame having a portion that presses to the front of the user's head and a rear frame having a portion that presses to the back of his/her head. The mounting unit is constituted so that the position of the rear frame with respect to the front frame can be adjusted to fit the head size of the user in a back and forth direction.

Further, to allow for such size adjustment, operation knobs which move together with the rear frame, and locking mechanisms which lock the rear frame into an arbitrary position with respect to the front frame, and lock release buttons for releasing the lock of the locking mechanisms are provided on the mounting unit.

In a conventional size adjustable mounting unit, the operation knobs and the lock release buttons are provided on both side surfaces of the front frame, and saw tooth-like projections are provided on the rear frame. In this unit, the adjusted position of the rear frame with respect to the front frame is fixed by engaging the locking mechanisms with any projection.

In Japanese Patent laid-open 2002-44566 (corresponding to US Patent Application Publication No. 2002-0008677), a mounting unit in which saw tooth-like projections are provided on the front frame and the operation knobs and lock release buttons are provided on both side surfaces at the tips of the rear frame, integrally having a portion pressing to the user's head, is proposed.

In the above-mentioned conventional size adjustable mounting unit, the lock mechanisms for maintaining a state where size adjustment is carried out, and the lock release buttons are provided on both side surfaces of the frame. For this reason, whether a user was to wear the unit or remove the unit from his/her head, neither the size adjustment operation nor lock release operation could be performed easily.

In the case where the operation knobs and the lock release buttons are provided on both side surfaces of the frame, such as shown in FIG. 8, the user must support the lower side of the frame 105 with his/her thumb while at the same time grasping the frame 105 from its top side, with his/her middle, ring and little fingers, then with his/her index finger he/she must operate the operation knob 107 and the lock release button 108.

Here, the possible range $L_1$ at which the operation knob 107 can be operated by the index finger is not so large. Since it is necessary to push the lock release button 108 perpendicularly (from the right and left side) to the side of the frame in this case, he/she must have the thumb positioned perpendicularly to the side of the frame, although the operation knob 107 must be operated with the thumb, if it is going to move the operation knob 107.

In this state, the frame is not supported with the thumb, as shown in FIG. 9, the remaining fingers must hold the frame from its top side, this way of holding the frame however is unnatural. Moreover, it is quite easy for the frame, that is, the entire image display apparatus to slip from the users' hands and drop.

SUMMARY OF THE INVENTION

The purpose of the present invention, is to propose a mounting unit which can be easily worn and while operating the size adjustment and lock release operation in the natural shape of user's hands.

In order to achieve this purpose, one aspect of a mounting unit for mounting the main apparatus of the head mounted apparatus (for example, head mounted display apparatus) on the front side of the head of a user, includes a front frame whose front portion is fixed to the main apparatus and whose right and left portions extend in a front-and-rear direction, and a rear frame which is connected to the front frame at both its right and left portions and is capable of moving in the front and rear directions, with respect to the front frame, and has a portion pressing the back of the user's head.

Moreover, the mounting unit includes knob members provided on both the right and left portions of the front frame. By pushing the knob members in a backwards direction, the rear frame moves backward with respect to the front frame.

Furthermore, the mounting unit includes locking mechanisms preventing the backwards movement of the rear frame with respect to the front frame, and lock release buttons which perform a lock release operation of the locking mechanisms.

The knob members are arranged on a lower side of both the frames. Moreover, each of the release buttons is arranged at a portion on each of the knob members, where the user pushes with his/her finger when the rear frame moves backward with respect to the front frame.

These and other objects, features and advantages of the mounting unit of the present invention will become more apparent upon reading the detailed description in the preferred embodiments and drawings.

DETAILED DESCRIPTION OF THE PREFERRED EMBODIMENTS

Hereinafter, an embodiment of the present invention will be described with the drawings.

Figure 1:
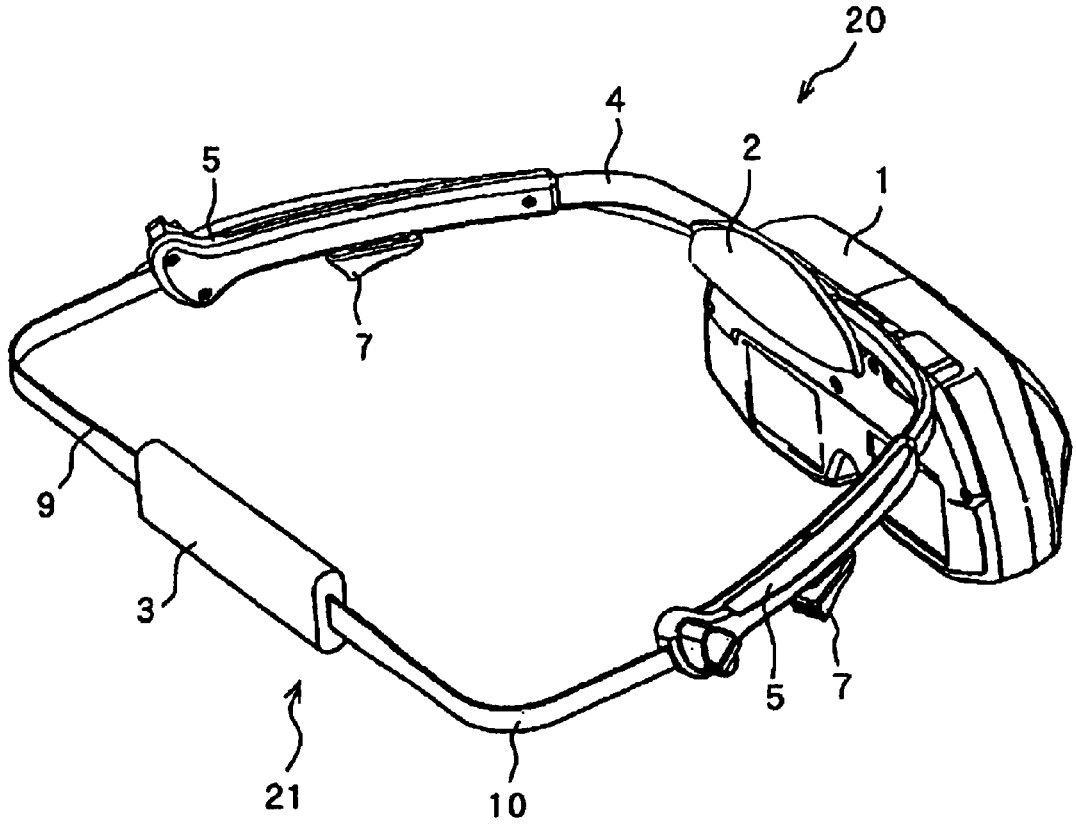
FIG. 1 shows a perspective view of a head mounted display apparatus including a mounting unit that is an embodiment of the present invention.

FIG. 1 shows whole structure of a head mounted display 20 including a mounting unit that is an embodiment of the present invention.

Reference numeral 1 shows a main apparatus of the head mounted display 20, which is to be arranged in front of a user's (observer's) eyes, and display enlarged images based on an original image displayed on the built-in liquid crystal display panel (or organic electro-luminescence element, etc.) by passing through the observation optical systems, to a user (observer).

Reference numeral 2 shows a front push-pressure pad which is pushed against the front of an observer's head. Reference numeral 3 shows a rear push-pressure pad which is pushed against the rear of the observer's head. The front push-pressure pad 2 is attached to the inner side of the front of the front frame 4 with a U-shape. The front frame 4 is fixed to the main apparatus 1 at the front thereof.

The rear push-pressure pad 3 also has a role of connecting the right and left belt-like frames 9 and 10, which are one pair. These belt-like frames 9, 10 and the rear push-pressure pad 3 constitute the rear frame 21 which has a U-shape as a whole.

The frame cover 5 is attached to the right and left arm portions of the front frame 4. Within the frame cover 5, the right and left arm portions of the front frame 4 and the right and left arm portions of the rear frame 21 (belt-like frames 9 and 10) are connected with each other. Therefore, the mounting unit is worn on the observer's head so that the circumference of the observer's head may be surrounded by it. In addition, the knob 7, to be explained later, is arranged under the right and left frame covers 5.

Here, the front frame 4 is formed of a material which has elasticity (e.g. metal, synthetic resin), and carries out elastic deformation on the inner side in the right and left direction while connected with the rear frame 21. For this reason, in the front frame 4, the elastic power expanding in a direction to the right and left (in a direction away from the head side) occurs. According to this elastic power, the rear frame 21 also becomes biased in a direction expanding to the right and left.

Figure 2:
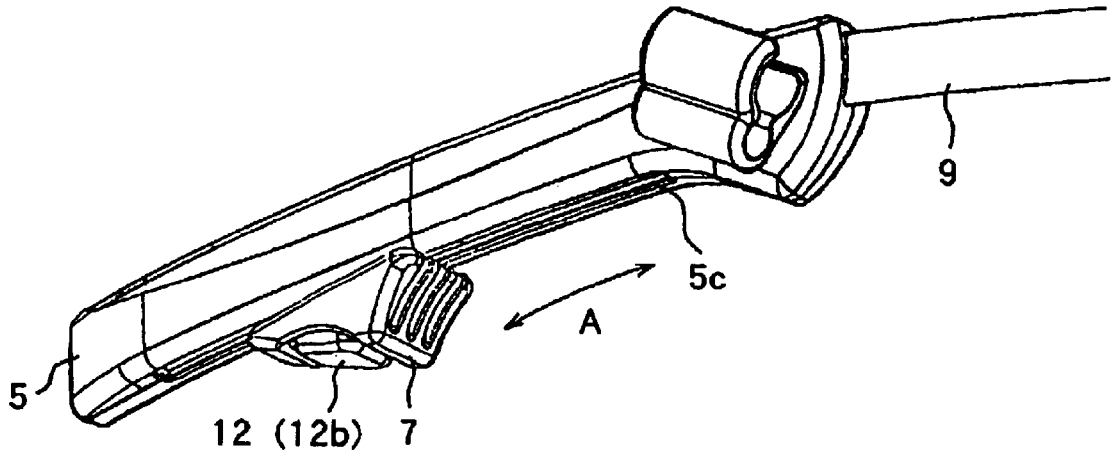
FIG. 2 shows a partial enlarged view of the mounting unit.

In FIG. 2, the perspective view of the left frame cover 5 is shown. Since mechanisms of the right and the left are symmetrical, the explanation about the right will be abbreviated. And in FIG. 3, the structure of the left frame cover 5 is shown.

Figure 3:
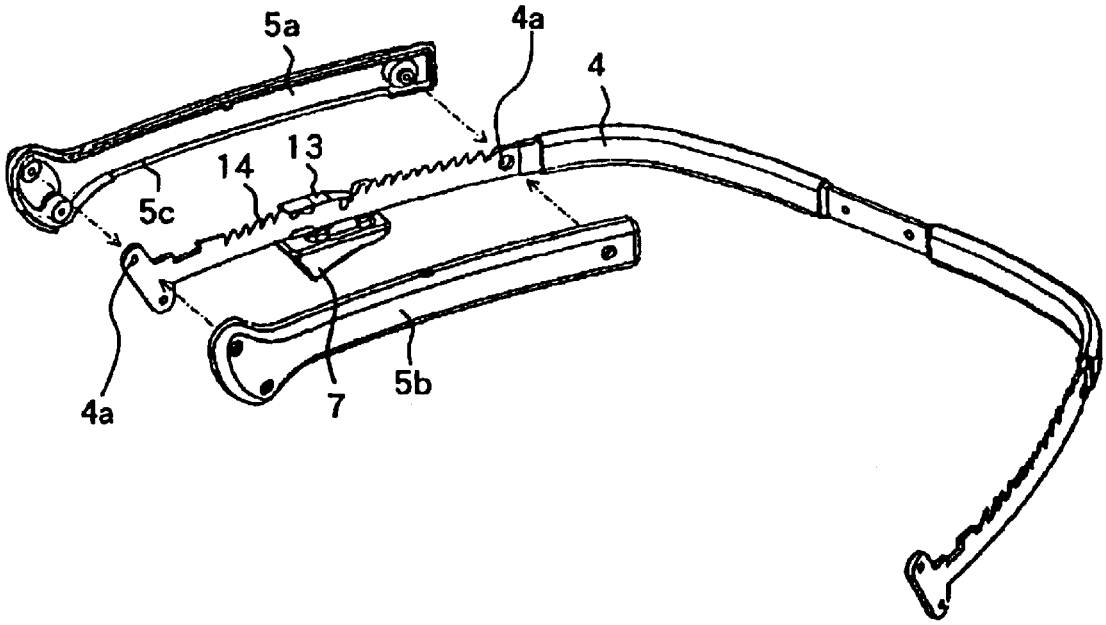
FIG. 3 shows an exploded perspective view of the mounting unit.

As shown in FIG. 3, the frame cover 5 is divided into two portions, an outside cover 5a and an inside cover 5b. Both the outside cover 5a and the inside cover 5b are united so as to cover the arm portion of the front frame 4, and are fixed to the arm portion of the front frame 4 by a screw (not illustrated) bolted to hole portions 4a formed on the front-and-rear side of the arm portion of the front frame 4.

A concave area extending in a longitudinal direction is formed on the lower portion of the outside cover 5a and the inside cover 5b, and by uniting the outside cover 5a and the inside cover 5b, as shown in FIG. 2, a guiding groove 5c is formed in the lower surface of the frame cover 5.

Figure 4:
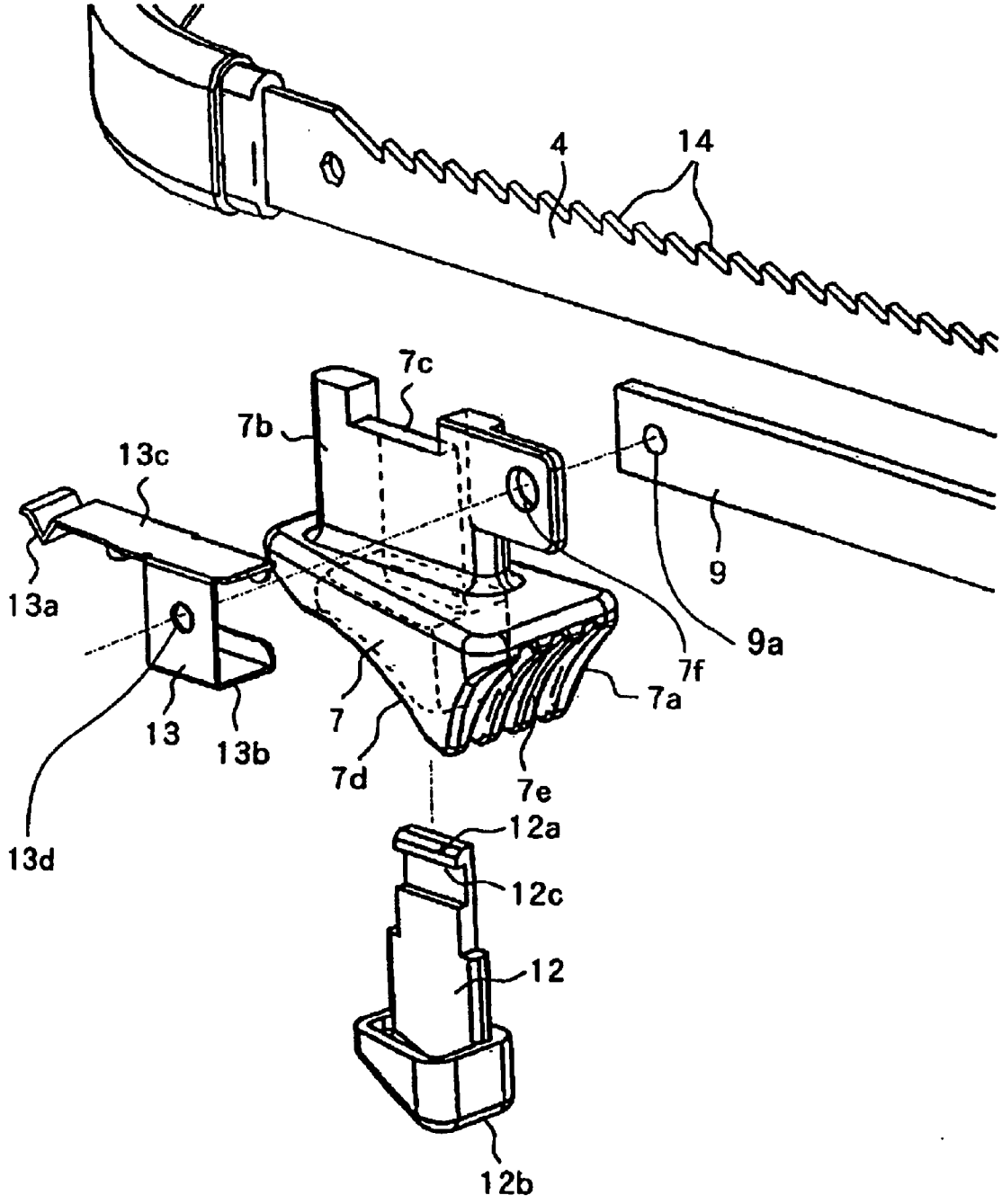
FIG. 4 shows an exploded perspective view of a knob and lock mechanism of the mounting unit.

In the area covered by the frame cover 5 among the arm portion of the front frame 4, as shown in FIG. 3 and FIG. 4, the saw tooth-like projections 14 are formed. Each of the projections 14 is formed so that a front-end (tip) thereof extends perpendicularly and the rear side thereof extends diagonally.

And, the knob 7, which is attached to the front end of the belt-like frame 9 constituting the rear frame 21 with a lock spring 13, which is a board spring, by a screw (not illustrated), is arranged under the arm portion of the front frame 4. As shown in FIG. 4, there are hole portions 7f, 9a and 13d, which are all concentric, in the knob 7, the belt-like frame 9 and the lock spring 13 respectively, and these hole portions 7f, 9a and 13d are unified by the screw (not illustrated) which is passed through them. Further, as a method of unification, the pin which is passed through the hole portions 7f, 9a and 13d, then may be flattened to prevent movement.

As shown in detail in FIG. 4, on the knob 7, an operation portion 7a which allows the observer to apply his/her finger, and a frame attachment portion 7b which extends upwards from the operation portion 7a, mounted by the screw on the front-end of the belt-like frame 9, and in which the above-described hole portion 7f is formed. The lock spring 13 is arranged on the upper portion of the frame attachment portion 7b, and fixed to the frame attachment portion 7b by using the screw for mounting the knob 7 to the belt-like frame 9.

In the lock spring 13, there is a spring portion 13c extending in the longitudinal direction of the flames, and a portion 13b having shape so as to hold from the lower side of the arm portions of the belt-like frame 9 and the front frame 4 which are arranged to align (overlap) with each other in the right and left direction, then the belt-like frame 9 and the front frame 4 are sandwiched between the portion 13b and a projection portion 13a formed at the front tip of the spring portion 13c. And when the projection portion 13a engages with any one of the projections 14 of the front frame 4, the back and froth movement of the rear frame 5 is locked to the front frame 4.

Figure 5:
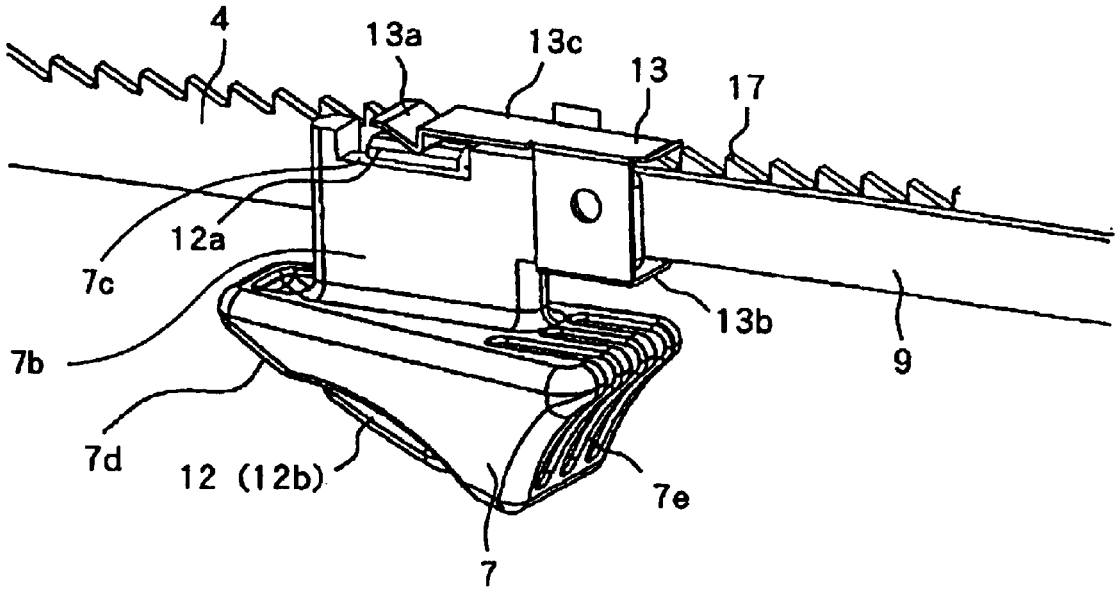
FIG. 5 shows a perspective view of the assembly state of the knob and lock mechanism.

Moreover, the hole (not illustrated) penetrated in the vertical direction is formed in the operation portion 7a of the knob 7, and the extension portion 12a of the lock release button 12 is inserted into the hole from the lower side of the knob 7. In this way, as shown in FIG. 5, the lock release button 12 is built into the knob 7, the front-lower surface (surface facing forward and downward) of a button portion 12b of the lock release button 12 and the front-lower surface (surface facing forward and downward) 7d of the operation portion 7a of the knob 7 are arranged in the approximately same surface. In addition, the area beside the lock release button 12 in the front-lower surface of the operation portion 7a of the knob 7 is formed in an arc-concaved shape so that it will not become obstructive when the lock release button 12 is pushed in with an observer's finger.

Moreover, as shown in FIG. 5, the upper end of the extension portion 12a of the lock release button 12 which is built into the knob 7 is directly located under the spring portion 13c of the lock spring 13. A step portion 12c is provided on the upper end of the extension portion 12a, and the falling out of the lock release button 12 is prevented by the step portion 12c being hooked on the concave-shaped bottom surface 7c which is formed in the upper end of the frame attachment portion 7b.

And, after connecting the front frame 4 and the rear frame 21 (belt-like frame 9) in this manner, the outside cover 5a and the inside cover 5b are aligned with each other and are attached to the front frame 4.

Thereby, as shown in FIG. 2, the projections 14 of the front frame 4, the knob 7 and the lock spring 13 are covered by the frame cover 5. Moreover, the frame attachment portion 7b of the knob 7 penetrates the guide groove 5c of the frame cover 5, and the operation portion 7a of the knob 7 is located under the frame cover 5 (that is, the front frame 4 and the rear frame 21). The knob 7 can be slid in a back and forth direction (direction A in FIG. 2) along the guide groove 5c of the frame cover 5.

Figure 7:
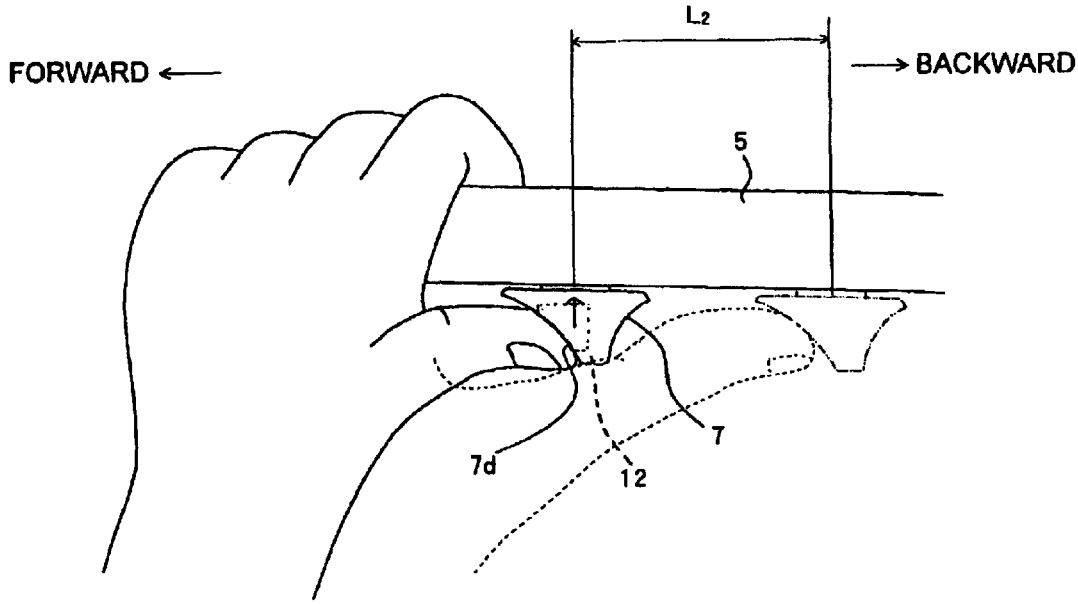
FIG. 7 shows an explanatory view of the operations of the mounting unit.
Figure 8:
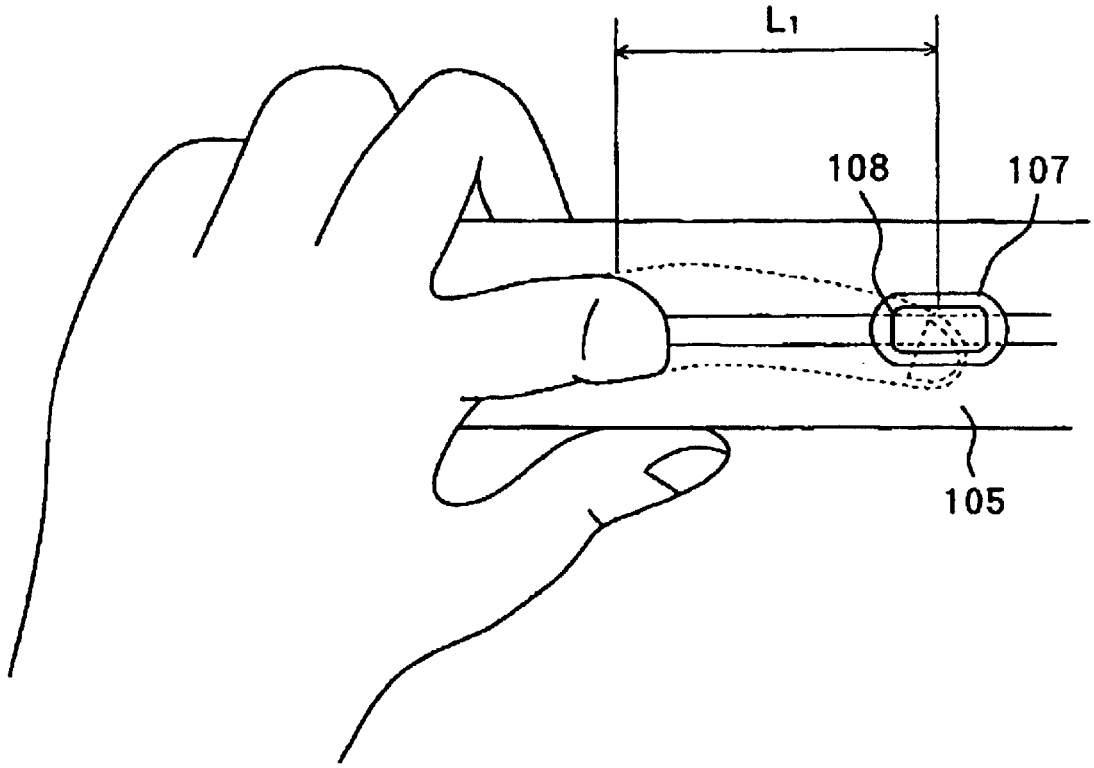
PRIOR ART FIG. 8
FIG. 8 shows an explanatory view of the operations of a conventional mounting unit.
Figure 9:
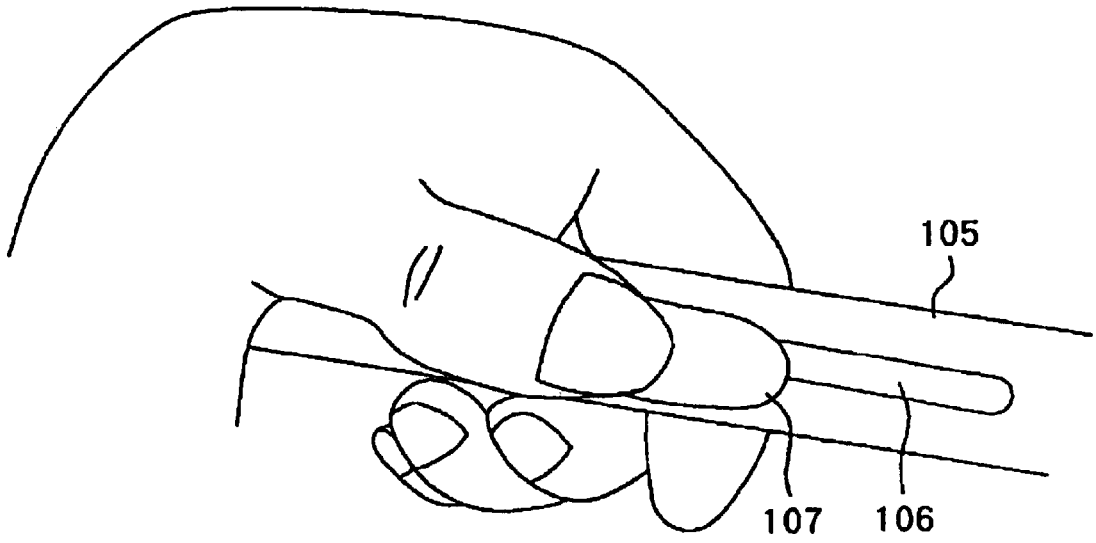
PRIOR ART FIG. 9
FIG. 9 shows an explanatory view of the operations of a conventional mounting unit.

When expanding the size of the mounting unit which is constituted as described above, as shown in FIG. 7, the observer applies his/her right and left thumbs to the front-lower surfaces 7d of the right and left knobs 7 which are located under the right and left frame covers 5, and supports the entire head mounted display 20. At this time, the thumbs are also applied to the lower surfaces of the lock release buttons 12 of the knobs 7. The other fingers are applied to the upper surfaces of the frame covers 5. In this state, the observer can hold naturally the frame covers 5 (the front frame 1) with his/her hands from the right and left sides.

From this state, if the knobs 7 are pushed with the thumbs in order to slide the rear frame 21 backwards, then the lock release buttons 12 are pushed up by the pushing pressure, and the tips of the extension portions 12b of the lock release buttons 12 pushes up the spring portions 13c of the lock springs 13. Thereby, engagement of the projection portions 13a of the lock springs 13c and the projections 14 of the front frame 4 can be separated, and the lock of the lock mechanisms can be released. In this way, the rear frame 21 can be made to slide backwards with the knobs 7.

Thereby, since the space between the front push-pressure pad 2 and the rear push-pressure pad 3 is expanded, the observer can wear the mounting unit on his/her head by inserting his/her head into the inner side of the front frame 4 and the rear frame 21. After wearing the mounting unit, the observer can apply his/her thumbs to the rear-lower surfaces (surfaces facing backward and downward) 7e of the knobs 7, and make the rear frame 21 slide forward with pushing the knobs 7 forward by the thumbs. In this time, since the projection portions 13a of the lock springs 13 only move up and down along the sloping surfaces of the projections 14 of the front frame 4, the lock isn't engaged.

And, if the rear frame 21 is made to slide forward until the front push-pressure pad 2 and the rear push-pressure pad 3 are pushed moderately upon the observer's head, since the projection portions 13a of the lock springs 13 engage with the vertical plane of the projections 14 of the front frame 4, the adjusted frame size can be maintained. Thereby, the main apparatus 1 (that is, the head mounted display 20) can be supported in front of the observer's eyes.

Additionally, when removing the head mounted display 20 from the head, the observer holds the frame covers 5 with his/her hands and applies his/her right and left thumbs to the front-lower surface 7d of the knobs 7 which are disposed under the right and left frame covers 5, and then pushes the knobs 7 backward. Thereby, in the same manner as described above, since the space between the front push-pressure pad 2 and the rear push-pressure pad 3 can be expanded, the observer can remove the mounting unit (that is, the head mounted display 20) from his/her head.

As described above, in the present embodiment, by arranging the knobs 7 under the frame covers 5 (the arm portions of the front frame 4), and providing the lock release buttons 12, which are used for releasing the lock of the lock mechanisms, on the surfaces on which the observer's thumbs are applied on the knobs 7 when the rear frame 21 is slid backward, the operation of the knobs 7 backward can be performed, and also the operation of the lock release can be performed naturally in a state where the frame cover 5 are held by the observer's hands in a natural shape. Moreover, since the knobs 7 can be operated with the thumbs, it is possible to operate the knobs 7 largely, without changing the position of the hands holding the frame covers 5.

Also, in the present embodiment, due to the elasticity of the front frame 4, elastic power is working in a direction which spreads the rear frame 21 in the right and left direction. If the rear frame 21 can move freely back and forth with respect to the front frame 4 by releasing the lock of the lock mechanisms, the total circumferential length (the length around the observer's head) of the mounting unit becomes larger by the spreading power. That is, since the rear frame 21 tends to move backward with respect to the front frame 4, it becomes possible to move the rear frame 21 backward by adding slight force to the knobs 7. Therefore, the observer can easily remove the head mounted display 20 from his/her head, without the need to exert great power.

Figure 6:
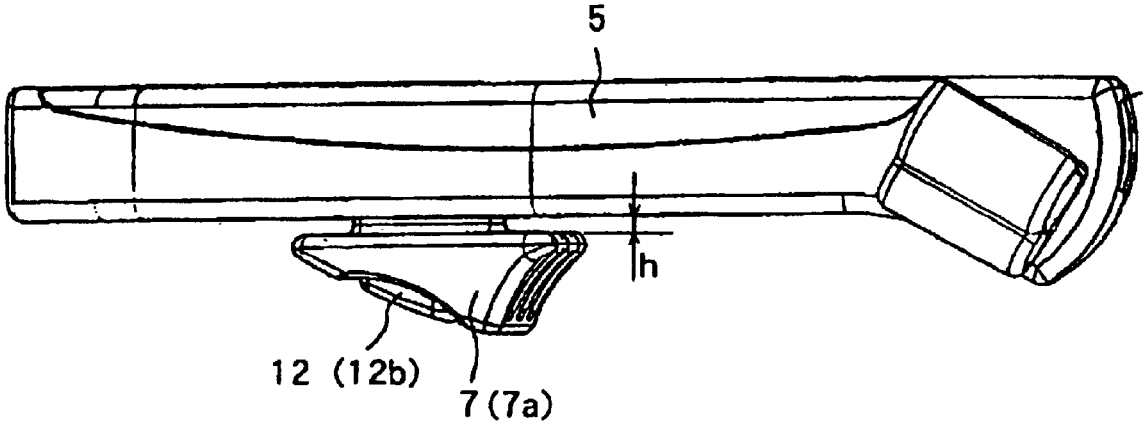
FIG. 6 shows a side view of the knob of the mounting unit.

In addition, in the present embodiment, as shown in FIG. 6, there is a certain amount of space h between the lower surface (guide groove 5c) of the frame cover 5 and the upper surface of the operation portion 7a of the knob 7. Thereby, the contact area of the frame cover 5 and the knob 7 can be minimal when the knob 7 is operated backward and forward, accordingly it is possible to make the additional force for operating the knob 7 minimal.

Here, although the preferred distance of the space h is about 5 mm, however the distance may be as small as in the range of 0.5 mm to 1 mm.

Here, the hair on both sides of the observer's head generally extends downward from the top. Therefore, if a knob is provided on the side surface of the frame as in the conventional method, there is the possibility of the hair being drawn between the side surface (especially, the area around the guide groove) of the frame and the knob.

One the contrary, in the present embodiment, since the guide groove 5c is arranged on the lower surface of the frame, and also the above-mentioned space h is provided, the possibility of hair being drawn in is quite low.

Therefore, according to the present embodiment, the mounting unit and the head mounted display apparatus having good operational ability in regards to being worn and removed, superior feeling can be realized when being worn.

As described above, according to the present embodiment, the observer can hold the frame of the mounting unit with his/her hands from the right and left direction in a natural shape, and then, without changing the grasp of the hands, can push the knob members with his/her thumbs, and position adjustment of the rear frame with respect to the front frame can be performed. Furthermore, when the knob member pushed by the thumb for expanding the size, the lock release button can also be operated naturally. Therefore, position adjustment can be performed easier than the conventional method.

Furthermore, since the movable range in the back and forth direction of the thumb in the state where the user is holding the frame of the mounting unit is larger than that of the index finger, a larger range $L_2$ of position adjustment can be obtained without changing the grasp of the hand. Therefore, a mounting unit that is more easily worn than the conventional method can be realized.

In addition, by arranging the upper surface of the knob member so as to keep a certain amount of space from the lower surface of the font frame, the frame and the knob members do to make contact with each other, therefore, it is possible to carry out the size adjustment with slight force by deceasing the sliding resistance of the front and rear frames, and also, it is possible to prevent his/her hair from being caught between the frames and the knob members.

Moreover, the front frame being an elastic member is united with the rear frame with biasing force spreading in the right and left direction, therefore, the rear frame also expands in the right and left direction. Thereby, when the lock of the lock mechanisms are released and the rear frame can be moved freely back and forth with respect to the front frame, the rear frame is moved backward by the biasing force and the length of the circumstance of the mounting unit is expanded. Therefore, it is possible to move the rear frame backward with slight force as well as the knob members, and, it is possible to wear the mounting apparatus on, and remove it from the head.

In addition, although a mounting unit for a head mounted display has been described in the above embodiment, a mounting unit of the present invention can be applied to all head mounted apparatuses besides the head mounted display.

While a preferred embodiment has been described, it is to be understood that modification and variation of the present invention may be made without departing from the spirit and scope of the following claims.

What is claimed is:

1. A mounting unit for mounting a main apparatus of a head mounted apparatus on the front side of the head of a user, comprising:

a front frame whose front portion is fixed to the main apparatus, and whose right and left portions extend in a front-and-rear direction, a rear frame which is connected to the front frame at its right and left portions and is capable of moving in the front-and-rear direction with respect to the front frame, and has a portion that presses the back of the user's head, knob members which are provided on both the right and left portions of the rear frame, when the knob members are pushed backward the rear frame moves backward with respect to the front frame, lock mechanisms which prevent the backward movement of the rear frame, release buttons which allows a lock release operation of the lock mechanisms to be performed, wherein, each of the knob members is arranged under both the frames, and, each of the release buttons is arranged such that the user may push with a finger on each of the knob members in order to move the rear frame backward with respect to the front frame.

2. The mounting unit according to claim 1, wherein, each of the release buttons is provided at the portion on each knob member where a user's thumb is applied while holding the front frame from the side direction in a state of being worn upon the user's head.

3. The mounting unit according to claim 1, wherein a top surface of the knob member is separated from a lower surface of the front frame.

4. The mounting unit according to claim 1, wherein the front frame is a member which has elasticity, and is connected to the rear frame in a state of being biased toward a direction of expanding to the right and left.

5. The head mounted apparatus comprising:

a main apparatus which is arranged at the front of a user's head; and the mounting unit according to claim 1, which is fixed on the main apparatus.

6. The head mounted apparatus according to claim 5, wherein the main apparatus is arranged in front of user's eyes, and displays an image.

* * * * *